US011272189B2

(12) United States Patent
Emmanuel et al.

(10) Patent No.: US 11,272,189 B2
(45) Date of Patent: Mar. 8, 2022

(54) ADAPTIVE ENCODING IN SECURITY CAMERA APPLICATIONS (71) Applicant: NETGEAR, INC., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

( * ) Notice: Subject to any disclaimer, the term of this patent is extended or adjusted under 35 U.S.C. 154(b) by 305 days.

(21) Appl. No.: 16/014,336

(22) Filed: Jun. 21, 2018

(65) Prior Publication Data

US 2019/0261007 A1 Aug. 22, 2019

Related U.S. Application Data (60) Provisional application No. 62/633,017, filed on Feb. 20, 2018.

(51) Int. Cl.
H04N 19/156 (2014.01)
H04N 19/164 (2014.01)
(Continued)

(52) U.S. Cl.
CPC .......... H04N 19/166 (2014.11); G06F 9/542 (2013.01); G06K 9/00771 (2013.01); G06T 7/20 (2013.01); G07C 9/37 (2020.01); G08B 3/10 (2013.01); G08B 3/1016 (2013.01); G08B 5/223 (2013.01); G08B 13/191 (2013.01); G08B 13/193 (2013.01); G08B 13/1966 (2013.01); G08B 13/19656 (2013.01); G08B 13/19669 (2013.01);
(Continued)

(58) Field of Classification Search
CPC ... H04N 19/166; H04N 5/917; H04N 21/2402
USPC .................................................. 375/240.03
See application file for complete search history.

(56) References Cited

U.S. PATENT DOCUMENTS 7,539,489 B1 5/2009 Alexander
8,855,035 B2 10/2014 Lemoine et al.
(Continued)

FOREIGN PATENT DOCUMENTS

CN 103493397 A 1/2014
CN 104066146 A 9/2014
(Continued)

OTHER PUBLICATIONS

"Amazon Kinesis Video Streams Developer Guide", Amazon Web Services, Inc., 2018, 136 pages.
(Continued)

Primary Examiner — Jeffery A Williams
(74) Attorney, Agent, or Firm — Perkins Coie LLP (57) ABSTRACT The disclosure is related to adaptive encoding of video streams from a camera. A camera system includes a camera and a base station connected to each other in a first communication network, which can be a wireless network. When a user requests to view a video from the camera, the base station obtains an encoded video stream from the camera and transmits the encoded video stream to a user device. The base station monitors multiple environmental parameters, such as network parameters, camera parameters, and system parameters of the base station, and instructs the camera to adjust the encoding of the video stream, in an event one or more environmental parameters change.

9 Claims, 5 Drawing Sheets (51) Int. Cl.

| | | |
|---|---|---|
| H04N 19/166 | (2014.01) | |
| H04N 5/00 | (2011.01) | |
| H04N 19/103 | (2014.01) | |
| H04N 19/124 | (2014.01) | |
| H04N 19/184 | (2014.01) | |
| H04N 19/40 | (2014.01) | |
| H04N 19/42 | (2014.01) | |
| H04B 17/318 | (2015.01) | |
| H04B 17/391 | (2015.01) | |
| H04N 5/232 | (2006.01) | |
| H05B 47/19 | (2020.01) | |
| G07C 9/37 | (2020.01) | |
| H05B 47/105 | (2020.01) | |
| G06F 9/54 | (2006.01) | |
| G06K 9/00 | (2022.01) | |
| G06T 7/20 | (2017.01) | |
| G08B 3/10 | (2006.01) | |
| G08B 5/22 | (2006.01) | |
| G08B 13/191 | (2006.01) | |
| G08B 13/193 | (2006.01) | |
| G08B 13/196 | (2006.01) | |
| G08B 21/18 | (2006.01) | |
| G08B 27/00 | (2006.01) | |
| G08B 29/18 | (2006.01) | |
| H04L 1/00 | (2006.01) | |
| H04L 5/00 | (2006.01) | |
| H04L 43/0852 | (2022.01) | |
| H04L 43/12 | (2022.01) | |
| H04L 43/16 | (2022.01) | |
| H04L 65/612 | (2022.01) | |
| H04L 65/65 | (2022.01) | |
| H04L 65/80 | (2022.01) | |
| H04L 67/1087 | (2022.01) | |
| H04N 5/247 | (2006.01) | |
| H04N 7/12 | (2006.01) | |
| H04N 7/18 | (2006.01) | |
| H04N 17/00 | (2006.01) | |
| H04W 24/08 | (2009.01) | |
| H04W 24/10 | (2009.01) | |
| H04W 28/02 | (2009.01) | |
| H04W 36/00 | (2009.01) | |
| H04W 36/30 | (2009.01) | |
| H04W 52/02 | (2009.01) | |
| H04W 72/04 | (2009.01) | |
| H04N 7/14 | (2006.01) | |
| H04N 19/00 | (2014.01) | |

(52) U.S. Cl.
CPC ..... *G08B 13/19695* (2013.01); *G08B 21/182* (2013.01); *G08B 27/006* (2013.01); *G08B 29/183* (2013.01); *H04B 17/318* (2015.01); *H04B 17/391* (2015.01); *H04L 1/0003* (2013.01); *H04L 1/0009* (2013.01); *H04L 1/0017* (2013.01); *H04L 1/0033* (2013.01); *H04L 5/0053* (2013.01); *H04L 43/0858* (2013.01); *H04L 43/12* (2013.01); *H04L 43/16* (2013.01); *H04L 65/4084* (2013.01); *H04L 65/608* (2013.01); *H04L 65/80* (2013.01); *H04L 67/1093* (2013.01); *H04N 5/23206* (2013.01); *H04N 5/23227* (2018.08); *H04N 5/23254* (2013.01); *H04N 5/247* (2013.01); *H04N 7/12* (2013.01); *H04N 7/183* (2013.01); *H04N 17/002* (2013.01); *H04N 19/103* (2014.11); *H04N 19/124* (2014.11); *H04N 19/156* (2014.11); *H04N 19/184* (2014.11); *H04N 19/40* (2014.11); *H04N 19/42* (2014.11); *H04W 24/08* (2013.01); *H04W 24/10* (2013.01); *H04W 28/021* (2013.01); *H04W 36/0011* (2013.01); *H04W 36/30* (2013.01); *H04W 52/0245* (2013.01); *H04W 52/0261* (2013.01); *H04W 72/042* (2013.01); *H04W 72/0453* (2013.01); *H05B 47/105* (2020.01); *H05B 47/19* (2020.01); *G06T 2207/30232* (2013.01); *G06T 2207/30241* (2013.01); *H04N 7/147* (2013.01); *H04N 7/181* (2013.01); *H04N 19/00* (2013.01)

(56) References Cited

U.S. PATENT DOCUMENTS

| | | |
|---|---|---|
| 9,179,495 B1 | 11/2015 | Scherzer et al. |
| 9,451,484 B2 | 9/2016 | Boulton |
| 9,712,814 B2 | 7/2017 | Tanaka et al. |
| 9,996,750 B2 | 6/2018 | Campbell |
| 10,033,436 B2 | 7/2018 | Thubert et al. |
| 10,044,104 B1 | 8/2018 | Bartko et al. |
| 10,177,965 B1 | 1/2019 | Joshi et al. |
| 10,425,638 B2 | 9/2019 | Yu et al. |
| 2002/0059627 A1 | 5/2002 | Islam et al. |
| 2002/0105921 A1 | 8/2002 | Sawyer et al. |
| 2002/0181637 A1 | 12/2002 | Nakabayashi |
| 2003/0055908 A1 | 3/2003 | Brown et al. |
| 2003/0063277 A1 | 4/2003 | Kennedy et al. |
| 2003/0193525 A1 | 10/2003 | Nygaard |
| 2005/0083947 A1 | 4/2005 | Vaarala et al. |
| 2005/0086569 A1 | 4/2005 | Hiddink et al. |
| 2005/0169209 A1 | 8/2005 | Miu et al. |
| 2007/0153916 A1* | 7/2007 | Demircin .......... H04N 21/23805 375/240.26 |
| 2008/0020746 A1 | 1/2008 | Alexandar et al. |
| 2008/0025378 A1 | 1/2008 | Mahany et al. |
| 2008/0026748 A1 | 1/2008 | Alexander et al. |
| 2008/0112315 A1 | 5/2008 | Hu et al. |
| 2008/0320108 A1 | 12/2008 | Murty et al. |
| 2009/0022222 A1 | 1/2009 | He et al. |
| 2009/0273679 A1 | 11/2009 | Gere et al. |
| 2009/0290019 A1 | 11/2009 | McNelis et al. |
| 2010/0080205 A1 | 4/2010 | Hirsch et al. |
| 2010/0097472 A1 | 4/2010 | Chathukutty et al. |
| 2010/0109934 A1 | 5/2010 | Drake et al. |
| 2010/0285753 A1 | 11/2010 | Foegelle |
| 2012/0314875 A1 | 12/2012 | Lee et al. |
| 2013/0021912 A1 | 1/2013 | Finlow-Bates et al. |
| 2013/0053653 A1 | 2/2013 | Cuddihy et al. |
| 2013/0089039 A1 | 4/2013 | Vashi et al. |
| 2013/0128947 A1 | 5/2013 | Fryer et al. |
| 2014/0036993 A1 | 2/2014 | Bae |
| 2014/0051379 A1 | 2/2014 | Ganesh et al. |
| 2014/0064120 A1 | 3/2014 | Sethuraman et al. |
| 2014/0092755 A1 | 4/2014 | Van De Ven et al. |
| 2014/0115114 A1 | 4/2014 | Garmark et al. |
| 2014/0169195 A1 | 6/2014 | Hsin et al. |
| 2014/0169509 A1 | 6/2014 | Tsofe |
| 2014/0240491 A1 | 8/2014 | Kauniskangas et al. |
| 2014/0269655 A1 | 9/2014 | Du et al. |
| 2014/0307707 A1 | 10/2014 | Mestanov et al. |
| 2014/0358592 A1 | 12/2014 | Wedig et al. |
| 2014/0368601 A1 | 12/2014 | DeCharms |
| 2015/0185857 A1 | 7/2015 | Jung |
| 2015/0229426 A1 | 8/2015 | Yu et al. |
| 2015/0312572 A1 | 10/2015 | Owen |
| 2015/0319411 A1 | 11/2015 | Kasmir et al. |
| 2015/0349859 A1 | 12/2015 | Emmanuel et al. |
| 2015/0381310 A1 | 12/2015 | Hammarwall et al. |
| 2016/0105644 A1 | 4/2016 | Smith et al. |
| 2016/0112935 A1 | 4/2016 | Ahuja et al. |
| 2016/0114887 A1 | 4/2016 | Zhou et al. |
| 2016/0125714 A1 | 5/2016 | Kates et al. |
| 2016/0165620 A1 | 6/2016 | Dagen et al. |
| 2016/0262120 A1 | 9/2016 | Shani et al. |
| 2016/0278104 A1 | 9/2016 | Hiremath et al. |

(56) References Cited

U.S. PATENT DOCUMENTS

| | | |
|---|---|---|
| 2016/0337243 A1 | 11/2016 | Cui et al. |
| 2016/0366702 A1 | 12/2016 | Baba et al. |
| 2017/0055179 A1 | 2/2017 | Radunovic et al. |
| 2017/0070732 A1 | 3/2017 | Roulet et al. |
| 2017/0078242 A1 | 3/2017 | Nakamura et al. |
| 2017/0180442 A1 | 6/2017 | Lawrence |
| 2017/0237673 A1 | 8/2017 | Law |
| 2017/0242129 A1 | 8/2017 | Kallankari et al. |
| 2017/0244712 A1 | 8/2017 | Meredith et al. |
| 2017/0301201 A1 | 10/2017 | Siann et al. |
| 2017/0301203 A1* | 10/2017 | Matsuura ............... G10L 25/51 |
| 2018/0306904 A1 | 10/2018 | Vacanti |
| 2018/0375594 A1 | 12/2018 | Kildal et al. |
| 2019/0014388 A1 | 1/2019 | Rutledge et al. |
| 2019/0132371 A1 | 5/2019 | Bhat et al. |
| 2019/0162769 A1 | 5/2019 | Zhao et al. |
| 2019/0200013 A1* | 6/2019 | Wu ..................... H04N 19/115 |
| 2019/0202657 A1 | 7/2019 | Li et al. |
| 2019/0222897 A1 | 7/2019 | Frusina et al. |
| 2019/0261370 A1 | 8/2019 | Amini et al. |
| 2019/0282897 A1 | 9/2019 | Posin |
| 2019/0364505 A1 | 11/2019 | Wang et al. |

FOREIGN PATENT DOCUMENTS

| | | |
|---|---|---|
| CN | 105246131 A | 1/2016 |
| CN | 106534634 A | 3/2017 |
| CN | 106954026 A | 7/2017 |
| JP | 2010232819 A | 10/2010 |
| WO | 2006075052 A1 | 7/2006 |
| WO | 2009048660 A2 | 4/2009 |

OTHER PUBLICATIONS

Ananthanarayanan, Ganesh, et al., "Real-time Video Analytics—the killer app for edge computing", Microsoft Research; IEEE Computer Society, Oct. 2017, 11 pages.

Girshick, Ross, "Fast R-CNN Object detection with Caffe", Microsoft Research, 2015, 30 pages.

Hosseini, Hossein, et al., "Attacking Automatic Video Analysis Algorithms: A Case Study of Google Cloud Video Intelligence API", University of Washington, Seattle, WA, Worcester Polytechnic Institute, Worcester, MA, Aug. 14, 2017, 12 pages.

* cited by examiner

ADAPTIVE ENCODING IN SECURITY CAMERA APPLICATIONS

CROSS-REFERENCE TO RELATED APPLICATION(S)

This application claims the benefit of U.S. Provisional Patent Application No. 62/633,017, entitled "OPTIMIZATION AND TESTING OF WIRELESS DEVICES" filed on Feb. 20, 2018, which is incorporated by reference herein in its entirety.

TECHNICAL FIELD

The disclosure is related to encoding a video stream captured from a security camera.

BACKGROUND

Video encoding is a process of converting a given video input into a digital format that is compatible with one or more types of Web players and mobile devices. The video encoding is performed using a video codec, which is an electronic circuit or software that compresses or decompresses digital video. The video codec converts uncompressed video to a compressed format or vice versa. The compressed data format usually conforms to a standard video compression specification. The compression is typically lossy, meaning that the compressed video lacks some information present in the original video. A consequence of this is that decompressed video can have lower quality than the original, uncompressed video because there is insufficient information to accurately reconstruct the original video. There are complex relationships between the video quality, the amount of data used to represent the video, which is determined by a bit rate, the complexity of the encoding and decoding algorithms, sensitivity to data losses and errors, ease of editing, random access, and end-to-end delay (latency).

When a video feed is transmitted to a user device, e.g., a live video stream, they are transmitted through a video server, which in turn streams the video stream to the user device. The network associated with the video server can dynamically change, e.g., bandwidth can decrease, noise level can increase, or there can be a lot of interference in the wireless network in which the user device receiving the video stream is located. All these factors affect the quality of the video and/or viewing experiences. However, the current video encoding techniques do not adapt to the change in environment, e.g., change in network parameters of network in which the streaming is performed, which can adversely affect the quality of the video stream.

SUMMARY

The disclosure is related to adaptive encoding of video streams from a camera. A camera system includes a camera and a base station connected to each other in a communication network, which can be a wireless local area network (WLAN). When a user requests for a video from the camera, the base station obtains an encoded video stream from the camera and transmits the encoded video stream to a user device, which can be any computing device associated with the user, such as a smartphone, a laptop, a tablet personal computer (PC), or a smart TV. The base station monitors multiple environmental parameters (also referred to as "input parameters"), such as network parameters and system parameters of the camera, base station and/or access point of the communication network, and instructs the video camera to adjust the encoding of the video stream, in an event one or more environmental parameters change.

The camera considers a number of encoding parameters when encoding the video stream, such as an encoding type, a specified bit rate, a frames-per-second, a resolution, a group of pictures (GOP) size etc. One or more of these encoding parameters are changed if one or more of the input parameters change, and the camera may adapt the encoding automatically, or in response to receiving instructions from the base station. For example, if a speed, e.g., a data rate, of the communication network decreases from a first bit rate to a second bit rate, the base station can automatically learn of the decrease in the speed of the second network, determine a target bit rate at which the video stream is to be encoded, and send an instruction to the camera to change a current bit rate of encoding the video stream to the target bit rate. In another example, if the base station determines that a packet loss, which is indicative of an amount of data lost in receiving the encoded video stream from the camera, is beyond a specified threshold, the base station can instruct the camera to decrease the bit rate, and then again instruct to increase the bit rate back up when the speed of the communication network improves. While speed of the second network is one of the input parameters to which the encoding can dynamically adapt, the encoding can be adapted to various other input parameters.

In some embodiments, the base station includes a system on chip (SoC) that can be used to monitor various environmental parameters, including one or more of a modulation and coding scheme (MCS) level data rate, a MAC layer throughput, a medium utilization parameter, a packet loss percentage, a retry percentage, an aggregation parameter, a noise level, a ratio of a number of active cameras to a number of cameras in the communication network, or a number of retry failures, temperature of sensor in the camera, memory and processing availability in the camera, or memory and processing availability in an access point of the communication network. The base station can continuously monitor the environmental parameters and dynamically adapt the encoding based on the input parameters. By adapting the encoding to the changing environmental parameters, the camera system not only ensures that the resources of the camera system consumed in transmitting the encoded video stream is minimized, it also ensures that the user continues to receive the video stream at or near an expected quality and with none to minimum data loss or delay in receiving the video stream.

DETAILED DESCRIPTION

Figure 1:
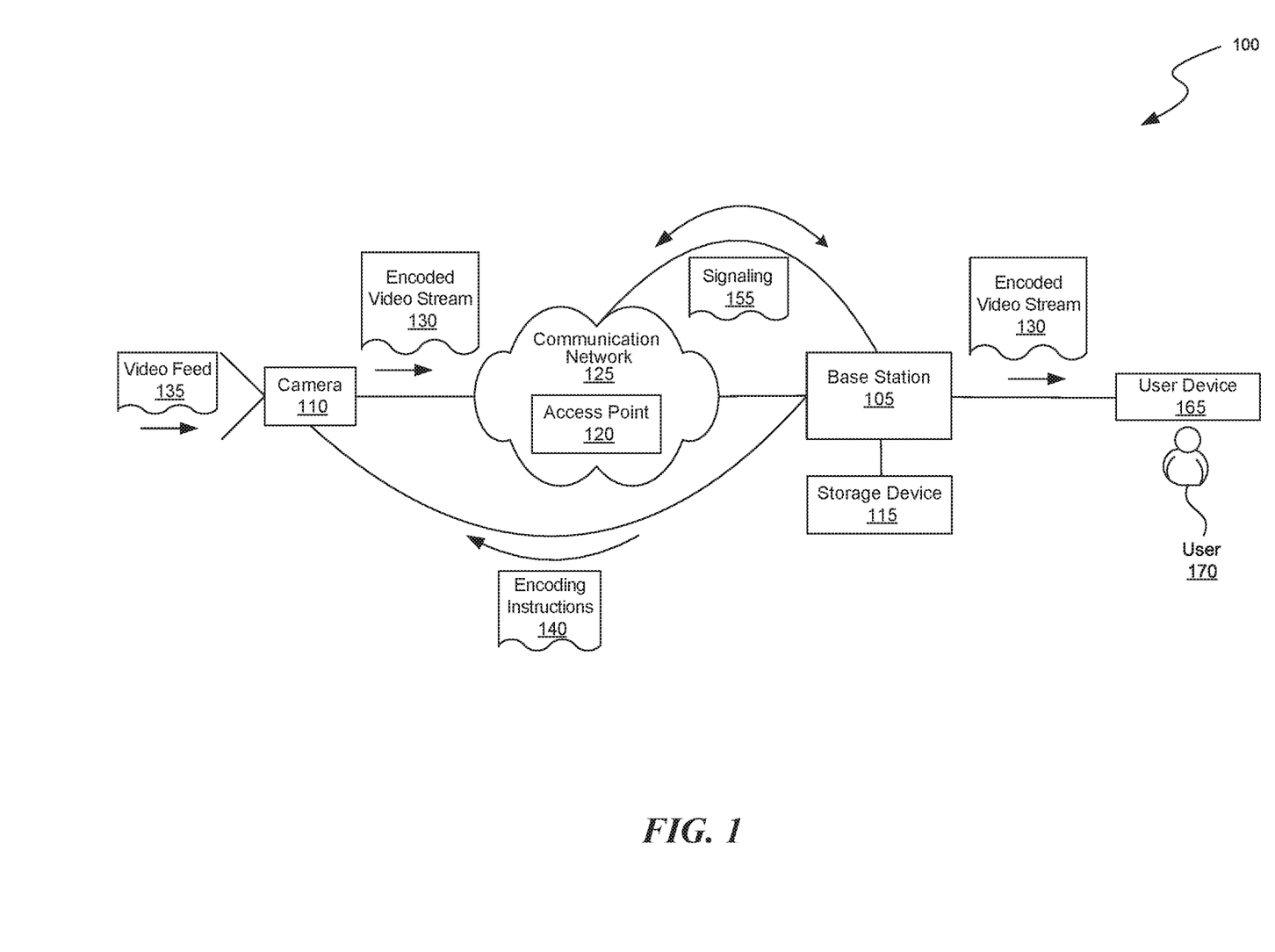
FIG. 1 is a block diagram illustrating an environment in which transcoding of a video stream in a camera system having a base station can be implemented.

FIG. 1 is a block diagram illustrating an environment in which adaptive encoding of a video stream in a camera system can be implemented. The environment 100 includes a camera system having a base station 105 and a camera 110. In some embodiments, the camera system is a security camera system that can be installed in a building, e.g., a house. The base station 105 and the camera 110 can be connected to each other using a communication network 125. The communication network 125 can be a local area network (LAN). In some embodiments, the communication network 125 is a wireless LAN (WLAN), such as a home Wi-Fi, created by an access point 120. The camera 110 and the base station 105 can be connected to each other wirelessly, e.g., over Wi-Fi, or using wired means. The base station 105 and the camera 110 can be connected to each other wirelessly via the access point 120, or directly with each other without the access point 120, e.g., using Wi-Fi direct, Wi-Fi ad hoc or similar wireless connection technologies. Further, the base station 105 can be connected to the communication network 125 using a wired means or wirelessly.

The camera 110 captures video feed 135 and transmits the video feed 135 to the base station 105 as an encoded video stream 130. The camera 110 encodes the video feed 135, e.g., using a codec such as H.264, H.265, MPEG-2, HEVC, to generate the encoded video stream 130. Further, a file format of the encoded video stream 130 can be one of many formats, e.g., AVI, MP4, MOV, WMA, or MKV. The encoded video stream 130 can include audio as well if the camera 110 has audio capabilities, e.g., a speaker and/or a microphone. The camera 110 can be battery powered or powered from a wall outlet. The camera 110 can include one or more sensors, e.g., a motion sensor that can activate the recording of the video when a motion is detected. The camera 110 can include infrared (IR) light emitting diode (LED) sensors, which can provide night-vision capabilities. Although the environment 100 illustrates a single camera 110, the camera system can include multiple cameras (which can be installed at various locations of a building). Further, all the cameras in the camera system can have same features, or at least some of the cameras can have different features. For example, one camera can have a night-vision feature while another may not. One camera can be battery powered while another may be powered from the wall outlet.

The base station 105 can be a computer system that securely connects the camera 110 to the Internet via the access point 120, The base station 105 can provide various features such as long range wireless connectivity to the camera 110, a local storage device 115, a siren, connectivity to network attached storage (NAS), and enhance battery life of the camera 110, e.g., by making the camera 110 work efficiently and keeping the communications between the base station 105 and the camera 110 efficient. The base station 105 can be configured to store the video captured from the camera 110 in any of the local storage device 115, the NAS, or a cloud storage service. The base station 105 can be configured to generate a sound alarm from the siren when an intrusion is detected by the base station 105 based on the encoded video stream 130 received from the camera 110.

Another feature of the base station 105 is that it can create its own network within the communication network 125, so that the camera 110 may not overload or consume the network bandwidth of the communication network 125. The camera 110 typically connects to the base station 105 wirelessly. The communication network 125 can include multiple base stations to increase wireless coverage of the base station 105, which may be beneficial or required in cases where the cameras are spread over a large area.

When a user 170 sends a request, e.g., from a user device 165, to view a live video feed from the camera 110, the base station 105 receives the request and in response to receiving the request, obtains the encoded video stream 130 from the camera 110, and streams the encoded video stream 130 to the user device 165. Upon receiving the encoded video stream 130 at the user device 165, a video player application in the user device 165 decodes the encoded video stream 130 and plays the video on a display of the user device 165 for the user 170 to view. The user device 165 can be any computing device that can connect to a network and play video content, such as a smartphone, a laptop, a desktop, a tablet personal computer (PC), or a smart TV.

Although the encoded video stream 130 is described as a live or real-time video stream from the camera 110, the encoded video stream 130 is not limited to real-time video stream, it can be a video stream retrieved from the storage device 115, the NAS or the cloud storage service.

The base station 105 monitors the environmental parameters in the communication network 125 and determines the encoding parameters to be used for encoding the video feed 135 to generate the encoded video stream 130. The encoding process is characterized by many encoding parameters, such as a bit rate, a quantization parameter, a frame rate, a group-of-pictures (GOP) size, an encoding type, and a resolution of the video. In some embodiments, a bit rate is a rate at which the camera 110 records the video feed 135. Bit rate is measured as a number of bits per second, e.g., megabits per second (Mbps). In some embodiments, the higher the bitrate the higher the quality of the encoded video stream 130.

A quantization parameter is indicative of compression of the encoded video stream 130. In some embodiments, the higher the quantization parameter the higher the compression of the encoded video stream 130 and lower the file size of the encoded video stream 130.

A frame rate is a number of frames that appear every second, which is measured in frames per second (fps). In some embodiments, the higher the frame rate, the more frames per second are used to display the sequence of images, resulting in smoother motion. The trade-off for higher quality, however, is that higher frame rates require a larger amount of data, which uses more bandwidth.

A GOP size is a number of frames between two consecutive key frames. In some video encoding types, such as MPEG-4 and H.264, the video stream consists of I-frames (key frames), P-frames, and B-frames (collectively referred as "delta frames"). An I-frame or the key frame is a self-containing frame or complete video frames that do not need references to other frames. P-frame and B-frame uses reference to previous I- or P-frame, and will contain only information about the content that is different compared to previous frame. The GOP stands for the number of frames between two I-frames. By increasing the length of GOP, there will be less I-frames per a certain amount of time. Since key frames are much bigger than delta frames by size, longer gaps between key frames can optimize the bandwidth consumption and storage space consumption. In some embodiments, the lower the GOP size the higher the bit rate and higher the file size of the encoded video stream 130.

A resolution of the video feed is indicative of a number of pixels used for recording the video feed 135. In some embodiments, the higher the resolution the higher the quality of the encoded video stream 130, the greater the file size of the encoded video stream 130 and greater the network bandwidth consumed in transmission of the encoded video stream 130. For example, a High-Definition (HD) or 720p resolution uses 1280×720 pixels, a full HD or 1080p resolution uses 1920×1080, and a 4K resolution uses 3840×2160 pixels.

An encoding type indicates a type of encoding used for encoding the video feed 135, such as H.264, H.265, HEVC, all of which differ in the video compression formats used for encoding the video and can result in consuming different amounts of computing resources for producing an encoded video stream 130 of a specified quality, and/or produce different qualities of encoded video streams 130.

The values of the encoding parameters to be used by the camera 110 in encoding the video feed 135 to generate the encoded video stream 130 depends on one or more environmental parameters associated with the environment 100. The environmental parameters include network parameters associated with the communication network 125, such as a modulation and coding scheme (MCS) level data rate, a media access control (MAC) layer throughput, a medium utilization parameter, a wireless channel of the communication network 125 used in the transmission of the encoded video stream 130, a packet loss percentage, a retry percentage, an aggregation parameter, a noise level, a ratio of a number of active cameras to a number of cameras in the communication network 125, or a number of retry failures, or error encoding techniques used in generating the encoded video stream 130. The environmental parameters can also include system parameters such as a central processing unit (CPU) usage or memory usage by the camera 110, CPU usage or memory usage by the access point 120, and/or CPU usage or memory usage by the base station 105, a temperature of sensor in the camera 110, or a storage space of the storage device 115 associated with the base station 105.

In some embodiments, MCS is a way to organize data surrounding how transmitters in Wi-Fi prepare data to be sent using various techniques, and MCS data rate is the speed or data rate of the communication network 125. The base station 105 can obtain the data rate from the access point 120, e.g., using signaling information 155.

MAC throughput is the data rate observed within Layer 2 of the Open Systems Interconnect (OSI) model. Layer 2 is responsible for forward error correction (FEC) and management of the channel (e.g. flow control, collision prevention, and TDMA timing). These functions typically add processing overhead which results in lower throughput than at the physical data rate (PHY—which is Layer 1 of OSI). Typically, the MAC throughput=0.65×PHY data rate. The base station 105 can obtain the MAC throughput from the access point 120, e.g., using signaling information 155.

Medium utilization is indicative of a utilization of a Wi-Fi medium, e.g., a wireless channel in the communication network 125, which is characterized by busy and idle periods in a wireless channel over a specified duration. Typically, the more the number of devices communicating over a specified channel of the communication network 125 the more the utilization of the specified channel. The base station 105 can obtain the medium utilization from the access point 120, e.g., using signaling information 155.

A packet loss percentage can be a percentage of data packets lost or not received by the base station 105 among the data packets transmitted by the camera 110 in transmitting the encoded video stream 130. The encoded video stream 130 is transmitted to the base station 105 as a series of data packets in which each data packet has at least a portion of the encoded video stream 130. In some embodiments, a packet loss is determined by the base station 105 based on the missing packet numbers, or is determined by the camera 110 based on a number of packets for which an acknowledgement is not received from the base station 105.

A retry is a retransmitted data packet from the camera 110 to the base station 105. A retry percentage is a percentage of retries among the data packets transmitted to the base station 105 over a specified period. In some embodiments, the higher the retry percentage the lower the MAC layer throughput. The base station 105 can obtain the retry percentage from the access point 120, e.g., using signaling information 155, or from the camera 110.

A retry failure is a failure in successfully retransmitting a data packet that the base station 105 did not receive from the camera 110. For example, the base station 105 received data packet number "50" and "52" but not "51," the camera 110 can retry transmitting data packet number "51" one or more times. However, if the base station 105 still does not receive the data packet number "51" after a specified number of retries, the retries are considered as a retry failure. The base station 105 can obtain a number of retry failures from the access point 120, e.g., using signaling information 155, or from the camera 110.

Frame aggregation is a feature of the communication network 125 that increases throughput by sending two or more data frames in a single transmission. In telecommunication, a protocol data unit (PDU) is information that is transmitted as a single unit among peer entities of a computer network. A PDU may contain user data or control information and network addressing. In Wi-Fi networking, the Layer 1 PDU is the bit, the Layer 2 (Data Link Layer of OSI) PDU is a data frame, the Layer 3 (Network layer of OSI) PDU is a data packet, and the Layer 4 (Transport layer of OSI) PDU is a segment for transmission control protocol (TCP) or a datagram for user datagram protocol (UDP). The aggregation parameter is indicative of a size of a data frame in the encoded video stream 130 transmitted by the camera 110 to the base station 105. In some embodiments, the size of the data frame is characterized by a number of Mac-PDUs (MPDU), such as data frames, per aggregated MPDU (A-MPDU), which is generated using A-MPDU aggregation method. The base station 105 can obtain the aggregation parameter from the access point 120, e.g., using signaling information 155.

In some embodiments, an expected MAC layer throughput for each camera in the communication network 125 is determined using the equation:

$$\text{Throughput} = \text{Wi-Fi\_PHY data rate} * \text{medium efficiency\_K} * \text{medium utilization} * \text{retries scale} * \text{aggregation scaling, where}$$

medium efficiency_K is a number between 0 and 1, which is indicative of medium efficiency when K clients are connected to the communication network 125, retries scale is a scaling done based on an average number of retries for a camera, and aggregation scaling, which is determined based on the aggregation parameter.

Noise is unwanted electrical or electromagnetic energy that degrades the quality of wireless signals and therefore, affect data transmission and reduce throughput. The noise level parameter is indicative of an amount of noise in the communication network 125. Noise can be caused by Wi-Fi and/or non-Wi-Fi devices. Non-Wi-Fi interference can be caused by devices include smart televisions, microwave ovens, cordless phones, Bluetooth devices, wireless video cameras, outdoor microwave links, wireless game controllers, ZigBee devices, fluorescent lights, WiMAX, and so on.

The foregoing environmental parameters are some examples of the input parameters that the base station 105 monitors and based on which the base station 105 determines the encoding parameters to be used by the camera 110 for encoding the video feed 135. The base station 105 can use hardware, software, or a combination to monitor at least some of the environmental parameters. For example, the base station 105 can include a system on chip (SoC) that is configured to monitor at least some of the environmental parameters. The SoC can send signaling information 155 to the access point 120 and/or to the camera 110 to obtain at least some of the environmental parameters. The base station 105 can determine the encoding parameters based on the environmental parameters, and instruct the camera 110, via encoding instructions 140, to perform the encoding of the video feed 135 based on the encoding parameters. The encoding instructions 140 can be sent to the camera 110 directly or via the access point 120. If any of the environmental parameters change, e.g., to create a problem condition, the base station 105 can adjust an encoding parameter or a network parameter based on the changed environmental parameter, and send encoding instructions 140 to the camera 110 for performing the encoding of the video feed 135 using the adjusted encoding parameter. Note that while the base station 105 adjusts the encoding parameters, in some embodiments, one or more environmental parameters may also be adjusted by the base station 105 in encoding the video feed 135.

As an example, the base station 105 can determine a target bit rate at which the video feed 135 is to be encoded by the camera 110 based on a speed, e.g., the MCS data rate, of the communication network 125. Generally, a maximum bit rate for encoding may not exceed 80% of the data rate of communication network 125, and the target bit rate, which is below the maximum bit rate, is typically the bit rate for which most part of the video feed 135 is encoded at. Based on the speed of the communication network 125 (and specified file size and quality of the video), the base station 105 can determine the target bit rate, and instruct the camera 110 accordingly, e.g., using encoding instructions 140, to encode at the target bit rate. The base station 105 continues to monitor the speed of the communication network 125, and if the speed decreases, e.g., beyond a specified threshold, the base station 105 can adjust the target bit rate, e.g., by decreasing the current bit rate at which the camera 110 is currently encoding, and instruct the camera 110 to continue encoding the video feed 135 at the adjusted target bit rate. The encoding instructions 140 sent by the base station 105 can include (a) the actual value of the encoding parameter, e.g., actual target bit rate value, (b) a delta by which the encoding parameter is to be adjusted, e.g., a delta by which current target bit rate value is to be adjusted, or (c) just an instruction to adjust the encoding parameter, e.g., increase or decrease the current bit rate, using which the camera 110 determines the actual value.

In some embodiments, if a packet loss in receiving the encoded video stream 130, is above a threshold, the MAC layer throughput is less than a threshold, or a medium utilization of a specified wireless channel is above a threshold, the base station 105 can adjust a network parameter associated with the communication network 125, e.g., change a wireless channel used to transmit the encoded video stream 130 to a different wireless channel of the communication network 125. For example, if the camera 110 is transmitting the encoded video stream 130 over a first wireless channel, the base station 105 can instruct the camera 110 to transmit the encoded video stream 130 over a wireless channel different from the first wireless channel, e.g., a second wireless channel.

The base station 105 can maintain a log of network activity in the communication network 125, e.g., in the storage device 115. For example, the network log can include network statistics such as a number of devices connected to the communication network 125, a type of the device connected to the communication network 125, the wireless channels to which the devices are connected, the number of active devices, which are devices that are transmitting or receiving data, the amount of data exchanged on the wireless channels, a time of the day at when the devices are active or using the communication network 125, a period of activity, a number of devices of a different communication network using a specified wireless channel, etc. Based on the network statistics, the base station 105 can determine or predict certain wireless parameters, such as a noise level, throughput, or a utilization of the wireless channels during a specified period, and can instruct the camera 110 accordingly to choose a specified wireless channel for transmitting the encoded video stream 130 in the specified period. For example, based on the network statistics, the base station 105 predicts that during 10 am to 12 pm, a noise level or utilization of a wireless channel, "channel 6" of 2.4 GHz band exceeds their respective thresholds, or a throughput of the wireless channel is below a threshold, because a number of devices connected to the communication network 125 (e.g., home Wi-Fi) and also a number of devices of a neighboring house connected to another communication network (e.g., neighbor house's Wi-Fi) use the same wireless channel, "channel 6". Accordingly, the base station 105 can instruct the camera 110 to use a different wireless channel in which the noise or the utilization is below the threshold, e.g., "channel 12," to transmit any encoded video stream 130 during that period. Further, the wireless channel to which the camera 110 switches can be the wireless channel of the same 2.4 GHz band to which the camera 110 was initially connected or of a different band, e.g., 5 GHz band.

In some embodiments, if the base station 105 determines that the problem condition is due to at least one of the packet loss exceeding a threshold, number of retries (e.g., retry percentage) exceeding a threshold, or number of retry failures exceeding a threshold, the base station 105 can instruct the camera 110 to decrease the target bit rate, switch to another wireless channel, or both. The base station 105 can continue to monitor the parameters and if the problem condition is not resolved yet, the base station 105 can instruct the camera 110 to decrease the target bit rate further. The base station 105 can continue to keep adjusting the encoding parameters or the network parameters until the problem condition is resolved. In some embodiments, the base station 105 can take multiple actions in resolving the problem condition. For example, in a first action, the base station 105 can attempt to resolve a problem condition of the packet loss being above a specified threshold by instructing the camera to switch from a first wireless channel to a second wireless channel. However, if the problem condition is still not resolved, the base station 105 can, in a second action, instruct the camera 110 to decrease the target bit rate from a first bit rate to a second bit rate.

Though the base station 105 can instruct he camera 110 to adjust the encoding parameters, in some cases, the camera 110 may make the final decision on the target bit rate or other video encoding parameters based on various parameters monitored by the camera 110, e.g., parameters associated with the generated video stream 130 such as content of video feed 135 and network parameters such as wireless channel parameters. By delegating the final decision to the camera 110, the base station 105 can minimize the latency in adjusting the encoding of the video feed 130 as it can avoid back and forth on information exchange with the camera 110 on video, buffer sizes, and other items that need to be monitored real time. For example, if there is a lot of motion in the video feed 135, the target bit rate can increase quickly in which case the camera 110 may decide based on parameters that are communicated from the base station 105. In another example, the camera 110 may determine that there is interference in the communication network 125, e.g., wireless network, which may result in dropped throughput, and the camera 110 may decide to reduce the target bit rate to adapt to the changed wireless environment while the camera 110 communicates the change in the wireless environment, e.g., the interference, to the base station 105, which can override or modify the decision of the camera 110 if needed.

The base station 105 can log information regarding the adjustments to the encoding performed in an action log, which can include information regarding the actions taken to resolve a specified problem condition, the values of the environmental and encoding parameters prior to and after taking the actions. For example, the base station 105 log information such as for a problem condition in which the packet loss was 46%, which exceeds the packet loss threshold of 25%, decreasing the bit rate from 8 Mbps to 5 Mbps brought down the packet loss to 20%, which is below the packet loss threshold. If multiple actions were taken to resolve a specified problem condition, information regarding multiple such actions are logged. The base station 105 can use the information from the action log in determining the actions to be taken or encoding and/or networking parameters to be adjusted for various problem conditions.

In some embodiments, if the MAC layer throughput is below a specified threshold, the base station 105 can improve the MAC layer throughput by instructing the camera to increase the aggregation parameter value, that is, increase the size of packet being transmitted by including more MPDUs in a AMPDU. In some embodiments, if the medium efficiency is below a specified threshold, the base station 105 can improve the efficiency by instructing the camera 110 to increase the aggregation parameter value, that is, increase the size of data frame being transmitted by including more MPDUs in a AMPDU.

The base station 105 can arrive at a specified target bit rate by adjusting one or more encoding parameters. For example, the base station 105 can increase a current bit rate of the encoded video stream 130 to the specified target bit rate by decreasing a quantization parameter if the packet loss in receiving the encoded video stream 130 is below a specified threshold. The base station 105 can then send an instruction to the camera 110 to encode the video feed 135 at the specified target bit rate and using the decreased quantization parameter. In some embodiments, a range of the quantization parameter may be fixed, e.g., which is indicative of an expected minimum video quality specified by the user 170.

In another example, the base station 105 can decrease the current bit rate of the encoded video stream 130 to the specified target bit rate by increasing a GOP size, which can also decrease the MAC layer throughput, in an event the packet loss in receiving the encoded video stream 130 is below a specified threshold. The base station 105 can then send an instruction to the camera 110 to encode the video feed 135 at the specified target bit rate and the GOP size parameter.

In another example, in an event the packet loss in receiving the encoded video stream 130 exceeds a specified threshold, the base station 105 can adjust the current bit rate of the encoded video stream 130 to the specified target bit rate by decreasing a GOP size, which results in an increase in the bit rate. However, if the increased bit rate is greater than the specified target bit rate, the increased bit rate can be lowered to the specified target bit rate by adjusting at least one of a frame rate and quantization parameter. The base station 105 can then send an instruction to the camera 110 to encode the video feed 135 at the specified target bit rate, frame rate, quantization parameter, and the GOP size parameter. In another example, the resolution of the video feed 135 can also be altered to obtain the specified target bit rate.

In another example, in an event a data rate of the communication network 125 is below a first specified threshold, a packet loss exceeds a second specified threshold, or the encoded video stream 130 is buffering at the user device 165, the base station 105 can instruct the camera 110 to drop the resolution and/or decrease a frame rate in recording the video feed 135. In some embodiments, changing the frame rate or resolution at which the video feed 135 is recorded may require the camera 110 to perform a hardware reset operation.

In some embodiments, the encoding of the video feed 135 can be adjusted by instructing the camera 110 to switch from a first encoding type, e.g., HEVC, to a second encoding type, e.g., H.264, in encoding the video feed 135.

In some embodiments, the encoding of the video feed 135 can be adjusted in a night vision mode by adjusting parameters such as gain, exposure, histogram, IR LEDs used to illuminate the scene, or resolution. For example, if the base station 105 determines that encoded video stream 130, which is encoded version of the video feed 135 captured in the night, has noise beyond a specified threshold, the base station 105 can instruct the camera 110 to reduce a gain and/or exposure in recording the video feed 135. In another example, the base station 105 can instruct the camera 110 to adjust a histogram between gamma and the brightness in recording the video feed 135 to reduce the noise. In another example, the base station 105 can instruct the camera 110 to reduce the noise by adjusting a pixel size used to record the video feed 135, e.g., by combining two or more pixels to form a bigger pixel, which reduces the resolution of the video feed 135.

In some embodiments, the base station 105 can reduce the noise by increasing number of IR LEDs to be used by the camera 110 for illuminating the scene. The base station 105 can determine to increase the number of IR LEDs in addition to or instead of decreasing the gain. For example, if the base station 105 determines that decreasing the gain below a threshold makes the video in the encoded video stream 130 very dark (which can be determined based on input received from the user or other automatic image processing means), the base station 105 can compensate for the decrease in brightness by increasing the number of IR LEDs to be used by the camera 110 for illuminating the scene. However, increasing the number of IR LEDs can increase battery consumption by the camera 110.

In some embodiments, the base station 105 can reduce the noise by controlling a temperature of the sensor in the camera 110. For example, the base station 105 can instruct the camera 110 to reduce the temperature of the sensor. Temperature control can be achieved by using various temperature control methods, such as cryogenic cooling or Peltier effect cooling. The temperature reduction can be performed in addition to or instead of other noise reduction methods described above. However, controlling the temperature of the sensor can increase battery consumption by the camera 110.

The base station 105 can determine an optimum combination of the night vision encoding parameters, such as number of IR LEDs to be used, resolution, gain, exposure or histogram, temperature to be adjusted (e.g., based on activity log and/or user feedback on various samples of night vision videos encoded with various combination of parameters), to obtain a balance between the battery life of the camera 110 and a quality of the video, and send an instruction to the camera 110 to adjust the encoding parameters accordingly.

In some embodiments, the base station 105 can also adjust encoding of the video feed 135 to minimize battery consumption by the camera 110. For example, if the base station 105 determines that a battery life in the camera 110 is less than a specified threshold, the base station 105 can instruct the camera 110 to drop the target bit rate used for encoding the video feed 135 by a specified amount, which can decrease the amount of battery power consumed in encoding the video feed 135. In another example, the base station 105 can instruct the camera 110 to increase the GOP size by a first specified amount and drop the quantization parameter by a second specified amount in encoding the video feed 135 in an event the battery life in the camera 110 is less than a specified threshold. Here the specified threshold below which the battery life is considered low and the video bit rate is to be modified may be of a default value or communicated to the camera 110 from the base station 105 (e.g., which can further be based on user preferences), but the decision to modify the bit rate may happen on the camera 110.

In some embodiments, the base station 105 can also adjust encoding of the video feed 135 to minimize consumption of system resources, such as CPU and/or memory, of the base station 105, camera 110, and/or the access point 120. For example, if the base station 105 determines that any of the CPU usage or memory usage by the camera 110, CPU usage or memory usage by the access point 120, and/or CPU usage or memory usage by the base station 105 exceeds a specified threshold or availability of the above resources is below a specified threshold, the base station 105 can instruct the camera 110 to drop the target bit rate used for encoding the video feed 135 by a specified amount, which can decrease the amount of one or more of the above resources needed for encoding, storing, transmitting or receiving the video feed 135. In another example, the base station 105 can instruct the camera 110 to increase the GOP size by a first specified amount and increase the quantization parameter by a second specified amount in encoding the video feed 135 in an event the usage of any of the above system resources exceeds a specified threshold or availability of the system resources is below a specified threshold.

The encoded video stream 130 can be stored at the storage device 115 associated with the base station 105. In some embodiments, the encoding can be adjusted based on the storage device 115 parameters such as a storage size of the storage device 115, available storage space in the storage device 115, or a write speed of the storage device 115. For example, if the base station 105 determines that any of the storage size of the storage device 115, available storage space in the storage device 115, or the write speed of the storage device 115 is below a specified threshold, the base station 105 can instruct the camera 110 to drop the target bit rate used for encoding the video feed 135 by a specified amount. If the availability of storage space in the storage device 115 is below a specified threshold, the base station 105 can send a notification to the user 170 indicating a low availability of the storage space. The user 170 may then copy out the contents of the storage device 115 to another storage device or let the contents be over written with new encoded video streams received from the camera 110.

In some embodiments, the encoding of the video feed 135 is also adjusted based on error correction techniques and data transmission protocols used in transmitting the encoded video stream 130. For example, FEC is a technique used for controlling errors in data transmission over unreliable or noisy communication channels. In FEC technique, the sender encodes the message in a redundant way by using an error-correcting code (ECC). The redundancy allows the receiver to detect a limited number of errors that may occur anywhere in the message, and often to correct these errors without retransmission. FEC gives the receiver the ability to correct errors without needing a reverse channel to request retransmission of data, but at the cost of a fixed, higher forward channel bandwidth. The data can be transmitted over a communication network using various protocols. The Real-time Transport Protocol (RTP) is one such network protocol for delivering audio and video over communication networks.

In some embodiments, the encoded video stream 130 is delivered to the base station 105 using RTP. In generating RTP data packets of the encoded video stream 130, the camera 110 can add ECCs to the encoded video stream 130, which can be used by the base station 105, in reconstructing one or more data packets of the encoded video stream 130 if they are missing or corrupted during transmission. The FEC technique can be adjusted to control packet loss. For example, if the frequency at which the packet loss occurs is above a specified threshold, or if the packet loss is above a specified threshold, the base station 105 can instruct the camera 110 to add more ECCs in the encoded video stream 130. However, adding more ECCs can increase the network bandwidth required for transmitting the encoded video stream 130 and increase CPU usage, therefore, battery consumption, of the camera 110. The base station 105 can determine whether to resolve the packet loss problem condition by adjusting FEC technique to add less or more ECCs, or by adjusting the target bit rate of encoding the video feed 135 based on a combination of the above parameters. For example, to avoid network congestion along the transmission path of the encoded video stream 130 in the communication network 125, the base station 105 may drop the target bit rate of encoding by a specified amount. However, the base station 105 may not drop the target bit rate if the packet loss can be recovered by ECCs that are added to the encoded video stream 130. For example, if the packet loss is 3% and if the base station 105 can recover up to 5% of packet loss using the FEC technique, the base station 105 may not drop the target bit rate—the base station 105 may decrease the target bit rate if the packet loss is more than what can be recovered using the FEC technique.

In some embodiments, the base station 105 can transmit the network activity log and the action log to a server (not illustrated), which can be used for learning the network environment and adapting the video encoding of the camera system accordingly. For example, if it can be learned from the action log that there are a few motion types on the camera 110 which result in higher bit rate than what can be transmitted, the base station 105 can adjust other video encoding parameters accordingly. Consider that a motion happens in the video feed 135 between 5:00 pm and 6:00 pm on a regular basis, e.g., when a family comes back home, and the camera 110 may require a higher bit rate at a specified quantization parameter to transmit the encoded video. However, if the base station 105 is aware of this repetitive nature of the motion between 5 pm and 6 pm, the base station 105 can change the quantization parameter, e.g., increase, upon start of a video that is similar to previous days' videos between 5 pm and 6 pm, e.g., in terms of I-Frame and P-frame sizes. In another example, if the base station 105 is aware that a capacity or network bandwidth of a wireless channel, which is used by the camera 110 to transmit the encoded video stream 130, is on an average at X Mbps at 7:00 pm, the base station 105 can instruct the camera 110 to start the target bit rate, of a video that needs to be captured at that time, at a number below X Mbps before the estimated throughput is further measured.

Figure 2:
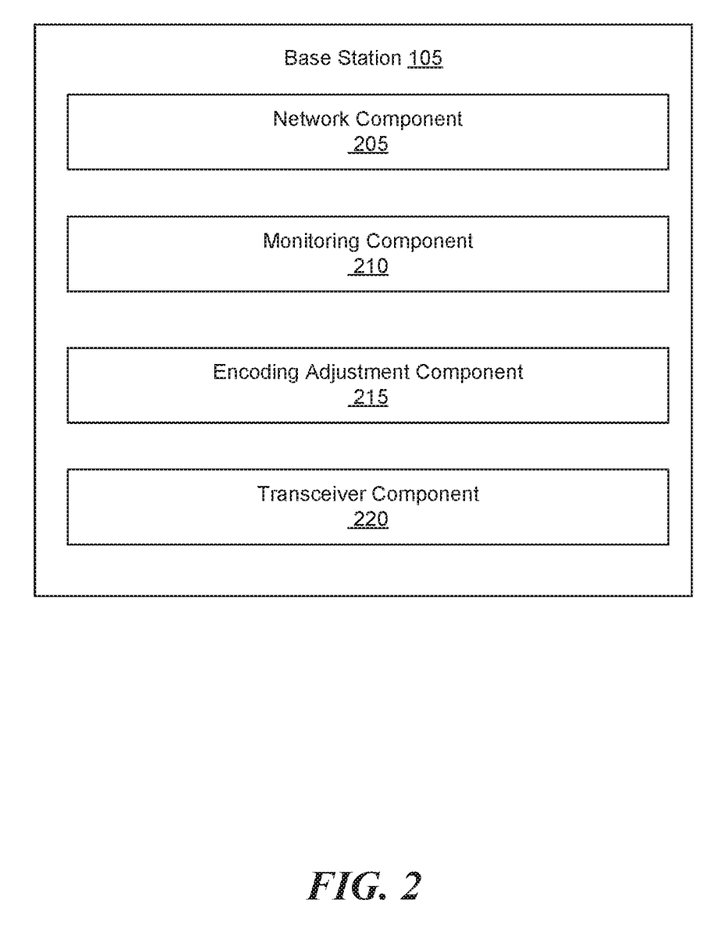
FIG. 2 is a block diagram of the base station of FIG. 1, consistent with various embodiments.

FIG. 2 is a block diagram of the base station of FIG. 1, consistent with various embodiments. The base station 105 has multiple components including a network component 205, a monitoring component 210, an encoding adjustment component 215, and a transceiver component 220. The network component 205 establishes the connection with the communication network 125, and between the base station 105 and the camera 110.

The monitoring component 210 monitors various parameters, such as environmental parameters and encoding parameters. In some embodiments, the monitoring component 210 can be implemented as SoC in the base station 105. The monitoring component 210 can monitor low-level or hardware level environmental parameters, such as PHY data rate, MCS data rate, MAC layer throughput, of the communication network 125, e.g., from the access point 120, which can be used in determining the encoding parameters for adjusting the encoding of the video feed 135.

The encoding adjustment component 215 determines the encoding parameters for adjusting encoding of the video feed 135. The encoding adjustment component 215 determines the encoding parameters based on the environmental parameters monitored by the monitoring component 210.

The transceiver component 220 receives an encoded video stream 130 from the camera 110. The transceiver component 220 can store encoded video streams 130 at and/or retrieve the encoded video streams 130 from various storage sites such as the storage device 115, NAS or a cloud storage service. The transceiver component 220 can send encoding instructions 140 to the camera 110 for adjusting the encoding of the video feed 135. The transceiver component 220 can receive user requests for live video streams from the camera 110 or recorded video streams stored at the various storage sites and transmit them to the users.

Additional details of the foregoing components are described at least with reference to FIGS. 3-4 below. Note that the base station 105 illustrated in FIG. 2 is not restricted to having the above components. The base station 105 can include lesser number of components, e.g., functionalities of two components can be combined into one component, or can include more number of components, e.g., components that perform other functionalities. In some embodiments, the functionalities of one or more of the above components can be split into two or more components. Furthermore, the components of the base station 105 can be implemented at a single computing device or distributed across multiple computing devices.

Figure 3:
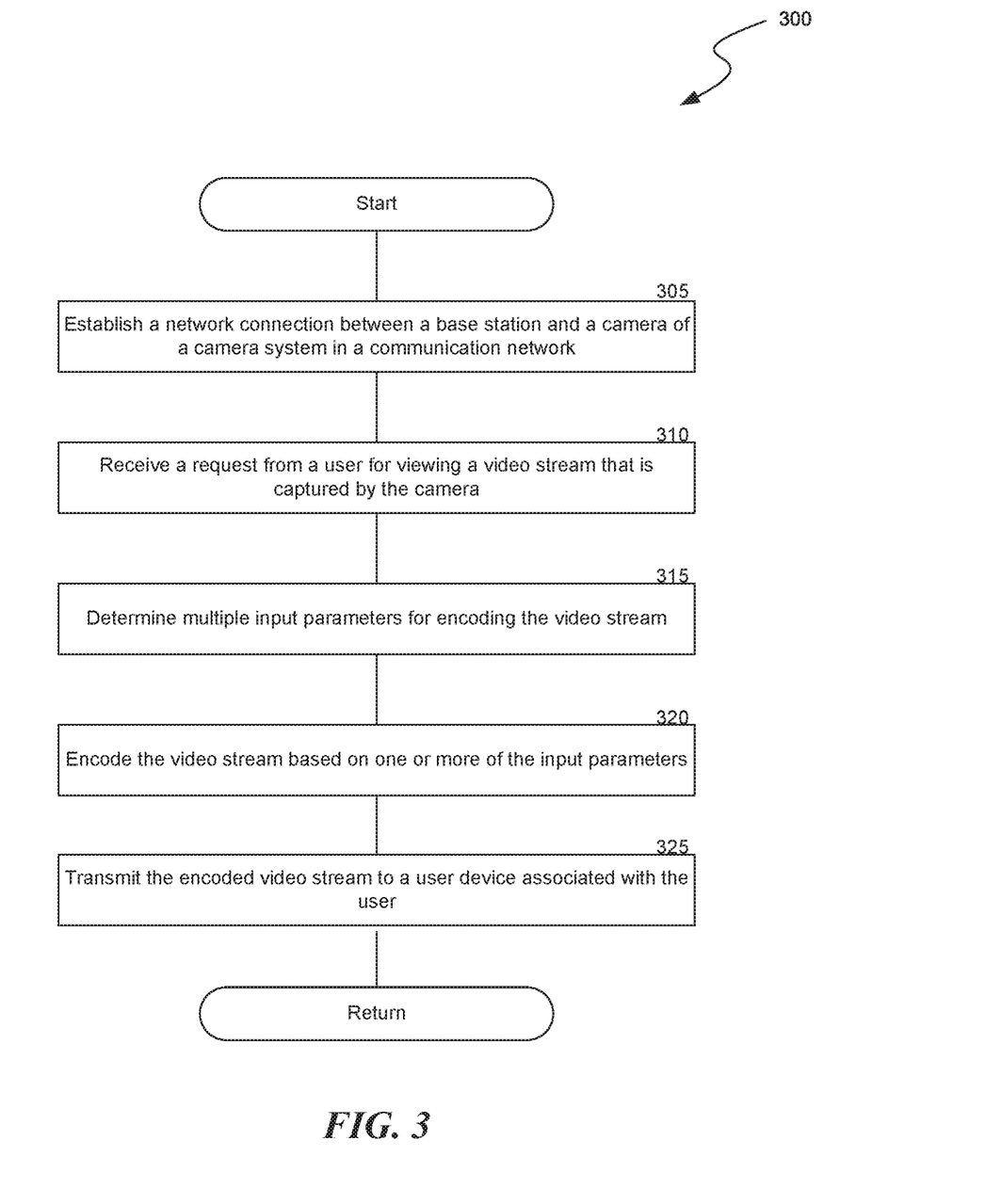
FIG. 3 is a flow diagram of a process for encoding a video feed using the base station of FIG, 1, consistent with various embodiments.

FIG. 3 is a flow diagram of a process 300 for encoding a video feed in a camera system having a base station, consistent with various embodiments. In some embodiments, the process 300 can be implemented in the environment 100 of FIG. 1. At block 305, the network component 205 establishes a network connection between the base station 105 and the camera 110 in the communication network 125. For example, the network component 205 can connect the base station 105 to the communication network 125, either wirelessly or using wired means, discover the camera 110 in the communication network 125 and connect the camera 110 to the base station 105, again either wirelessly or using wired means.

At block 310, the transceiver component 220 receives a request from the user 170 for a video feed 135 that is captured using the camera 110. The request can be for a real-time video stream from the camera 110 or a recording that is stored at one of the various storage sites. The video feed 135 can also include audio data.

At block 315, the monitoring component 210 determines multiple input parameters that may be used in determining the encoding parameters for encoding the video feed 135. For example, the monitoring component 210 determines environmental parameters, including one or more of MCS level data rate of the communication network 125, a MAC layer throughput of the communication network 125, a medium utilization parameter, a packet loss percentage, a retry percentage, an aggregation parameter, a noise level, a ratio of number of active cameras to a number of cameras in the communication network 125, or a number of retry failures, temperature of sensor in the camera 110, or memory and processing availability in the camera 110, access point 120 or the base station 105.

At block 320, the encoding adjustment component 215 determines the encoding parameters to be used for encoding the video feed 135 based on one or more of the environmental parameters. The encoding parameters include one or more of a bit rate, a quantization parameter, a frame rate, a GOP size, an encoding type, and a resolution of the video. After determining the encoding parameters, the transceiver component 220 sends encoding instructions 140 to the camera 110, which includes the encoding parameters to be used by the camera 110 for encoding the video feed 135. The camera 110 encodes the video feed 135 to generate the encoded video stream 130, and sends the encoded video stream 130 to the base station 105. The camera 110 can encode the video feed 135 using hardware, software, or a combination thereof. In some embodiments, the camera 110 encodes the video feed 135 using a hardware encoder.

At block 325, the transceiver component 220 receives the encoded video stream 130 from the camera 110, and transmits the encoded video stream 130 to the user device 165.

Figure 4:
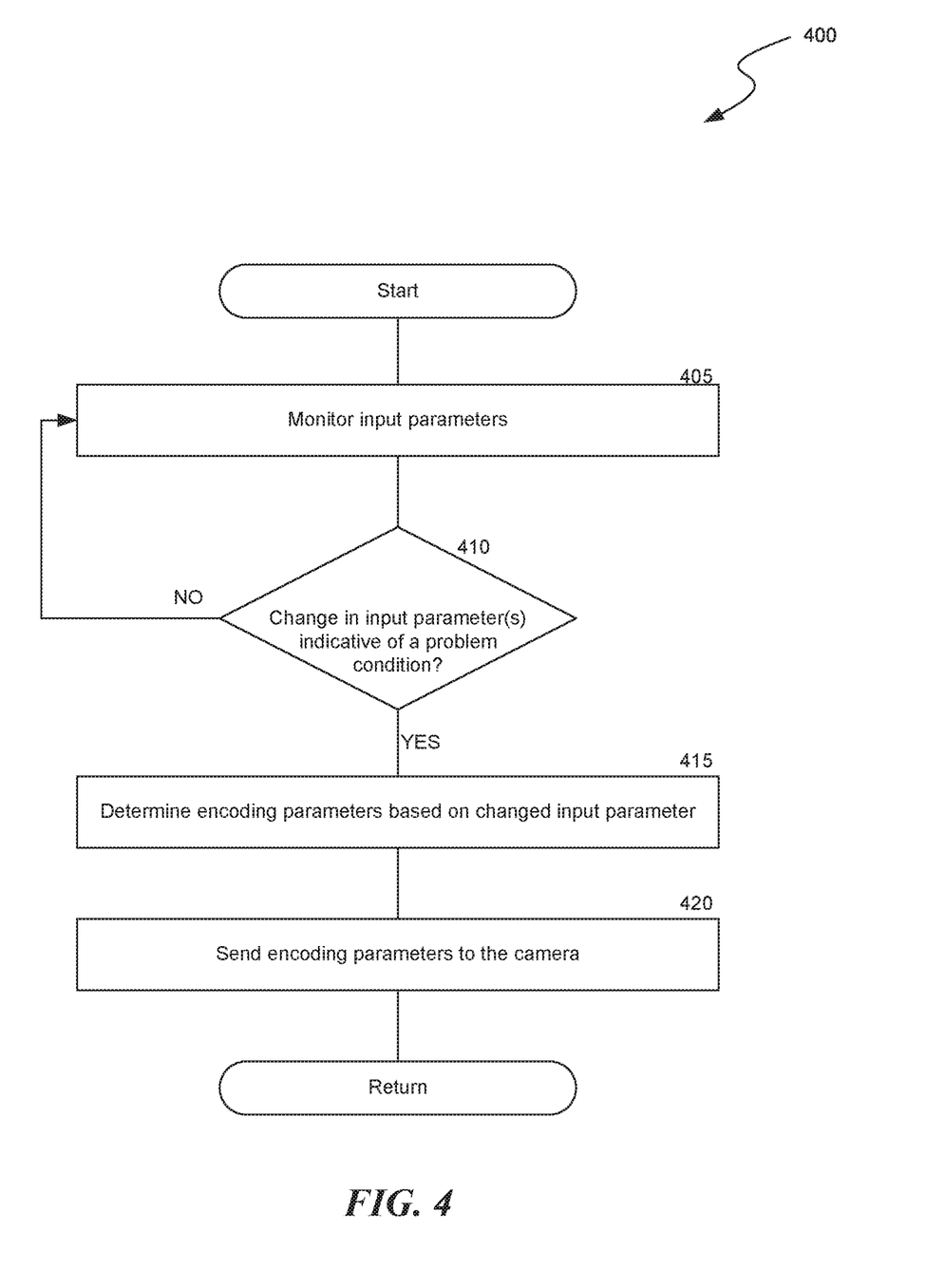
FIG. 4 is a flow diagram of a process for dynamically adapting the encoding of a video feed, consistent with various embodiments.

FIG. 4 is a flow diagram of a process 400 for dynamically adapting the encoding of a video feed, consistent with various embodiments. The process 400 may be implemented in environment 100 of FIG. 1, and can be executed as part of block 320 of process 300. At block 405, the monitoring component 210 continues to monitor the environmental parameters that may be used in determining the encoding parameters to be used in encoding the video feed 135.

At determination block 410, the monitoring component 210 determines whether any of changes in the input parameters are indicative of a problem condition. In some embodiments, the change in an input parameter is indicative of a problem condition when the input parameter value is beyond a specified threshold. For example, if the speed of the communication network 125 drops below a threshold, the change in speed can be indicative of a problem condition. In another example, if a network bandwidth of the communication network 125 drops below a first threshold or a packet loss at the base station 105 in receiving the encoded video stream 130 exceeds a second threshold, the change can be indicative of a problem condition. Although thresholds for various environmental parameters can be predefined, e.g., defined by the camera system, in some embodiments, a user can define or alter the threshold for at least some of the environmental parameters.

If the monitoring component 210 determines that the change in input parameter is not indicative of a problem condition, the process 400 returns to block 405 where the monitoring component 210 continues to monitor the input parameters.

On the other hand, if the monitoring component 210 determines that a specified input parameter has changed beyond a specified threshold or the change is indicative of a problem condition, at block 415, the encoding adjustment component 215 adjusts the encoding of the video feed 135 by determining encoding parameters based on the changed specified input parameter. For example, consider that a data rate of the communication network 125 drops from 15 Mbps to 5 Mbps, the encoding adjustment component 215 can adjust the encoding of video feed 135 by dropping a target bit rate at which the video feed 135 is to be encoded from 8 Mbps to 4 Mbps. The encoding adjustment component 215 determines that the target bit rate for encoding the video feed 135 in the communication network 125 with a speed of 5 Mbps should be 4 Mbps. The encoding adjustment component 215 can also alter other encoding parameters in addition to or instead of the target bit rate examples of which are described at least with reference to FIG. 1 above, At block 420, the transceiver component 220 sends the encoding instructions to the camera 110, which includes instructions for encoding the video feed 135 based on the encoding parameters determined in block 415.

Figure 5:
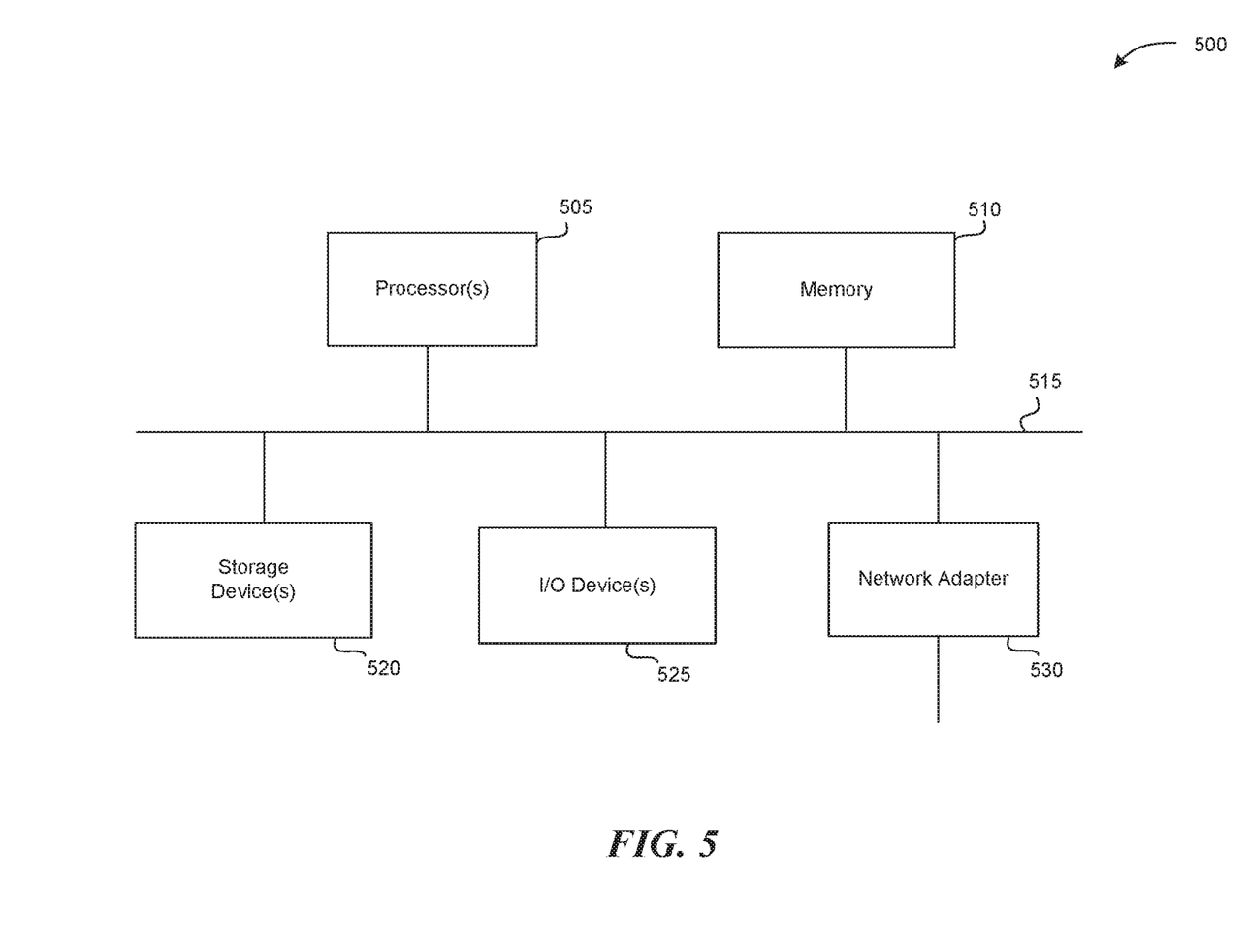
FIG. 5 is a block diagram of a computer system as may be used to implement features of some embodiments of the disclosed technology.

FIG. 5 is a block diagram of a computer system as may be used to implement features of some embodiments of the disclosed technology. The computing system 500 may be used to implement any of the entities, components, modules, interfaces, or services depicted in the foregoing figures (and any other components described in this specification). The computing system 500 may include one or more central processing units ("processors") 505, memory 510, input/ output devices 525 (e.g., keyboard and pointing devices, display devices), storage devices 520 (e.g., disk drives), and network adapters 530 (e.g., network interfaces) that are connected to an interconnect 515. The interconnect 515 is illustrated as an abstraction that represents any one or more separate physical buses, point to point connections, or both connected by appropriate bridges, adapters, or controllers. The interconnect 515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 510 and storage devices 520 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 510 can be implemented as software and/or firmware to program the processor(s) 505 to carry out actions described above. In some embodiments, such software or firmware may be initially provided to the processing system 500 by downloading it from a remote system through the computing system 500 (e.g., via network adapter 530).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A method comprising:
receiving, at a base station and from a user device associated with a user, a request for viewing a video stream that is captured by a camera,
wherein the camera and the base station are connected to each other in a first network via an access point device;
determining, at the base station, multiple input parameters for adjusting encoding of the video stream by the camera,
wherein the multiple input parameters include a system parameter of the access point device and a network parameter indicative of a problem condition of the first network;
sending, to the camera, encoding instructions based on the system parameter and the problem condition,
wherein the base station delegates a final decision on an encoding parameter for encoding the video stream to the camera;
causing the camera to adapt the encoding of the video stream in accordance with the encoding parameter and based on the system parameter and the problem condition to generate an encoded video stream;
receiving, via the access point device, the encoded video stream from the camera to the base station; and
transmitting, by the base station, the encoded video stream from the base station to the user device over a second network different from the first network.

2. The method of claim 1, wherein the network parameter includes any of a modulation and coding scheme (MCS) level data rate, a MAC layer throughput, a retry percentage, an aggregation parameter, a noise level, a ratio of number of active cameras to a number of cameras in the first network, or a number of retry failures.

3. The method of claim 1, wherein causing the camera to adapt the encoding of the video stream includes:
monitoring, by the camera, one or more of the multiple input parameters,
determining, by the camera, that a specified input parameter of the one or more of the multiple parameters has changed,
determining, by the camera, whether to adjust the encoding of the video stream based on the the network parameter or based on the encoding instructions, and
responsive to a determination to adapt the encoding of the video stream based on the network parameter, adjusting, by the camera, the encoding of the video stream based on the network parameter to generate the encoded video stream.

4. The method of claim 1, wherein causing the camera to adapt the encoding of the video stream includes:
   determining, by the base station, that a capacity of a specified wireless channel in the first network that is used to transmit the encoded video stream to the base station is at a specified rate at a specified time, and
   sending, by the base station, an instruction to the camera to start encoding the video stream at the specified time at a target bit rate below the specified rate before an estimate throughput of the specified wireless channel is further measured.

5. A computer-readable storage medium storing computer-readable instructions, comprising:
   instructions for receiving, at a base station and from a user device associated with a user, a request for viewing a video stream that is captured by a camera,
   wherein the camera and the base station are connected to each other in a first network via an access point device;
   instructions for determining, at the base station, a system parameter of the access point device or a change in a network parameter value indicative of a problem condition of the first network;
   instructions for sending, to the camera, the system parameter and the problem condition or encoding instructions based on the system parameter and the problem condition,
      wherein the base station delegates a final decision on an encoding parameter to the camera;
   instructions for causing the camera to adapt encoding of the video stream based on the system parameter or the problem condition,
      wherein the encoded video stream is generated in accordance with the encoding parameter;
   instructions for receiving, via the access point device, the encoded video stream from the camera to the base station; and
   instructions for transmitting the encoded video stream from the base station to the user device over a second network different from the first network.

6. A base station, comprising:
   a hardware processor; and
   a memory device storing instructions, which, when executed by the at least one hardware processor, cause the base station to:
      establish a connection with a first network and to a camera in the first network via an access point device;
      monitor multiple input parameters for adjusting encoding of a video stream captured by the camera,
         wherein the multiple input parameters include a system parameter of the access point device or the base stations and a network parameter of the first network; and
      cause the camera to encode the video stream based on the multiple input parameters; and
   a network transceiver configured to:
      receive the encoded video stream from the camera via the access point device, and
      transmit the encoded video stream to a user device over a second network different from the first network.

7. The method of claim 1, wherein the problem condition indicates a speed or network bandwidth of the first network dropped below a first threshold or a packet loss at the base station in receiving the encoded video stream exceeded a second threshold.

8. The method of claim 1, wherein the system parameter of the access point is a first system parameter, the method further comprising, prior to determining the problem condition:
   monitoring, by the base station, the first system parameter of the access point, a second system parameter of the camera, a third system parameter of the base station, and the network parameter of the first network,
   wherein the encoding of the video stream is based on the first, second, and third system parameters in addition to the problem condition, and
   wherein the first, second, and third system parameters relate to a utilization of a local central processing unit (CPU) or utilization of a local storage space.

9. The base station of claim 6, wherein the base station is configured to obtain the network parameters from a system-on-chip on the base station.

\* \* \* \* \*